United States Patent Office 3,491,108
Patented Jan. 20, 1970

3,491,108
5,5-DIALKYL-SUBSTITUTED 1,3-THIAZOLIDIN-2-ONES
Gerhard F. Ottmann, Hamden, and Haywood Hooks, West Haven, Conn., assignors to Olin Mathieson Chemical Corporation, a corporation of Virginia
No Drawing. Filed Sept. 18, 1967, Ser. No. 668,688
Int. Cl. C07d 91/16; A01n 9/22
U.S. Cl. 260—306.7
11 Claims

ABSTRACT OF THE DISCLOSURE

N-substituted-S-chloroisothiocarbamyl chlorides react with secondary aldehydes to provide a series of substituted 1,3-thiazolidin-2-ones having a chlorine atom at the 4-position. This compound is reduced, hydrolyzed or reacted with such compounds as ammonia, alcohols, amines, etc., to effect replacement of the 4-chlorine with hydrogen, hydroxy, amino, primary amino, secondary amino, etc. moieties.

This invention relates to a series of substituted 1,3-thiazolidin-2-ones having the formula

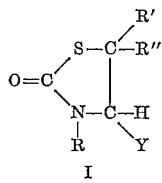

I wherein R is phenyl, tolyl, xylyl, phenyl having a lower alkoxy substituent, halogenated phenyl, nitrated phenyl or alkyl having 1–18 carbon atoms; R' and R" are independently selected alkyl having 1–12 carbon atoms and Y is chlorine, hydrogen, hydroxy, alkoxy, aryloxy, sulfhydryl, alkylmercapto, arylmercapto, isocyanato, isothiocyanato, ureido, thioureido, carbamato, thiocarbamato, amino, alkylamino, dialkylamino, arylamino, diarylamino, arylalkylamino or a substituted 4-amino-1,3-thiazolidin-2-one moiety. This invention also relates to a process for preparing substituted 1,3-thiazolidin-2-ones having the Formula I wherein Y is chlorine.

Various substituted 1,3-thiazolidin-2-ones have been previously prepared and reported in the literature. For example, Shigeru Yoshida in Pharm. Bull. (Japan) 2, 249–53 (1954) discloses the compound 3-benzyl-4-hydroxy-4-phenyl-1,3-thiazolidin-2-one, while the preparation of the monosubstituted 3-chlorophenylthiazolidin-2-one by reacting ethylene sulfide with p-chloroaniline to provide N-(β-mercaptoethyl)-p-chloroaniline and subsequently reacting the latter compound with phosgene is described by Yu. K. Yuryev et al. in J. Gen. Chem. (U.S.S.R.) 27, 3306–7 (1957).

Now it has been found that a series of valuable 1,3-thiazolidin-2-ones containing selected substituents in the 4-position and further characterized by a fully substituted 5-position and a substituted ring nitrogen can be provided according to this invention.

Compounds having the Formula I wherein Y is a reactive chlorine are prepared by the reaction of an N-substituted-S-chloroisothiocarbamyl chloride with a secondary aldehyde in accordance with the following equation wherein R, R' and R" are as previously described.

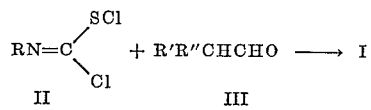

The N-substituted-S-chloroisothiocarbamyl chlorides II employed in the preparation of the substituted 4-chloro-1,3-thiazolidin-2-ones I are known compounds and are fully described in U.S. Patent No. 3,328,462. While any of the N-substituted-S-chloroisothiocarbamyl chlorides described therein can be employed in the process of this invention, preferred embodiments employ those compounds II wherein R is lower alkyl, i.e. alkyl having 1–5 carbon atoms and phenyl.

Any secondary aldehyde having the formula

wherein R' and R" are as previously defined can be utilized in the reaction with the N-substituted-S-chloroisothiocarbamyl chloride II. Exemplificative aldehydes include 2-ethylbutyraldehyde, 2-ethylhexanal, iso-butyraldehyde, 2-methylbutyraldehyde, 2-methylundecanal, etc.

While any secondary aldehyde having the Formula III can be suitably employed in the process of this invention, preferred embodiments utilize aldehydes III wherein R' and R" are independently selected alkyl moieties having 1–4 carbon atoms.

The process of this invention comprises reacting an N-substituted-S-chloroisothiocarbamyl chloride II with one of the previously described secondary aldehydes at a temperature between about −20 to 100° C., and preferably between about 0 and 40° C., in the presence of an inert organic solvent. The reaction is exothermic and proceeds rapidly to provide a solid intermediate having properties which vary according to the beginning materials employed in the reaction. Thus, some intermediates can be readily isolated while others are converted immediately to the desired substituted 4-chloro-1,3-thiazolidin-2-one I. The more stable intermediates are converted to the substituted 4-chloro-1,3-thiazolidin-2-one I upon standing for a period of time which again varies according to the structure of the intermediate. Alternately, the conversion of these intermediates is accelerated by warming the intermediate in a moisture-free atmosphere.

Any solvent which is inert to the reactants and product can be employed in the preparation of the substituted 4-chloro-1,3-thiazolidin-2-one I. Thus, ethers such as diethyl ether, dimethyl ether, methyl iso-propyl ether, tetrahydrofuran and the like; aromatic hydrocarbons such as benzene, toluene, xylene, etc. and aliphatic hydrocarbons such as pentane, hexane, heptane, and the like can be employed.

The substituted 4-chloro-1,3-thiazolidin-2-one I is then employed in the preparation of various other substituted 1,3-thiazolidin-2-ones having the formula I. Thus, hydrolysis of the compounds I wherein Y is chlorine at temperatures of about 0 to 100° C. provide the corresponding substituted 4-hydroxy-1,3-thiazolidin-2-ones I in high yield. If desired, the intermediate obtained in the preparation of some of the previously described chloro compounds can be hydrolyzed directly, without isolating the substituted 4-chloro-1,3-thiazolidin-2-one I.

A variety of substituted 4-alkoxy or aryloxy-1,3-thiazolidin-2-ones I can be provided by reacting the substituted 4-chloro-1,3-thiazolidin-2-one I with the appropriate alcohol or phenol in an inert solvent medium at a temperature between about −20 and 100° C. Illustrative alcohols which can be employed in the previously described reaction include methanol, ethanol, n-propanol, iso-propanol, n-butanol, iso-butanol, t-butanol, n-hexanol, n-octanol, iso-dodecanol and benzyl alcohol. Phenols such as phenol, chlorophenols, methoxyphenols, nitrophenols, xylenols and toluols are exomplificative of beginning materials suitable to prepare the substituted 4-aryloxy-1,3-thiazolidin-2-ones I.

In another embodiment of this invention, substituted 4-amino-1,3-thiazolidin-2-ones I are prepared by reacting ammonia with the previously described substituted 4-chloro-1,3-thiazolidin-2-one I at a temperature between about −20 and +20° C., and preferably between about 0 and 10° C., while maintaining an excess of ammonia during the reaction. The desired amino compound having the Formula I is readily obtained in high yield and excellent purity.

Where the previously described reaction of ammonia with a substituted 4-chloro-1,3-thiazolidin-2-one I is not carried out in the presence of an excess of ammonia, a dicyclic compound consisting of two substituted 1,3-thiazolidin-2-one rings connected by an NH-group in the 4-position is obtained.

Various other substituted 1,3-thiazolidin-2-ones having the Formula I can also be prepared employing the substituted 4-chloro-1,3-thiazolidin-2-ones as a beginning material. Thus, the chlorine in the 4-position is replaced with a primary or secondary amine substituent by reaction with the appropriate aliphatic or aromatic amine. Illustrative amines include methylamine, dimethylamine, ethylamine, diethylamine, propylamine, dipropylamine, iso-propylamine, di-iso-propylamine, butylamine, dibutylamine, n-hexylamine, di-n-hexylamine, n-octylamine, octadecylamine, dioctadecylamine, hexadecylamine, dihexadecylamine, aniline, N-methylaniline, N-ethylaniline, toluidines, nitranilines, halogenated anilines, naphthylamines, etc.

An alternate method for preparing some of the aforementioned primary or secondary amine substituted derivatives of I comprises reacting the previously described substituted 4-hydroxy-1,3-thiazolidin-2-one I with the appropriate primary or secondary amine in such a way that the water formed in this reaction is azeotropically removed.

Reduction of the substituted 4-chloro-1,3-thiazolidin-2-ones I provides the corresponding compounds having the Formula I wherein Y is hydrogen. Any suitable complex metal hydride can be utilized in the preparation of these compounds, but lithium aluminum hydride is preferably employed. This process is carried out at a temperature between about −25 and +40° C., and preferably between about 0 and 10° C.

Also included in the scope of this invention are 4-isocyanato and 4-isothiocyanato derivatives of I. Thus, the substituted 4-chloro-1,3-thiazolidin-2-one I is reacted with an appropriate metal isocyanate and metal isothiocyanate respectively, for example, potassium isocyanate, sodium isothiocyanate, etc. to effect replacement of the chlorine atom in the 4-position.

Substituted 4-(sulfhydryl, alkylmercapto or arylmercapto)-1,3-thiazolidin-2-ones are readily provided by the reaction of the 4-chloro derivative of I with an alkali metal mercaptide, an alkyl mercaptide or an aryl mercaptide respectively.

While most of the previously described 4-substituted 1,3-thiazolidin-2-ones I are derived from the 4-chloro derivatives of I, some of these 4-substituted materials are further reacted to provide other compounds included in Formula I. Thus, substituted 4-amino-1,3-thiazolidin-2-ones I are reacted with various aliphatic and aromatic isocyanates and isothiocyanates to provide the corresponding ureas and thioureas. Examplificative isocyanates include alkyl-, cycloalkyl- and arylisocyanates such as phenyl isocyanate, p-chlorophenyl isocyanate, cyclohexyl isocyanate, p-nitrophenyl isocyanate, tolyl isocyanate, xylyl isocyanate, methyl isocyanate, ethyl isocyanate, n-propyl isocyanate and the like. In a similar manner, the corresponding isothiocyanates provide the appropriate thioureas. Alternately, these substituted 4-ureido- and 4-thioureido-1,3-thiazolidin-2-ones I can be prepared by reacting the 4-isocyanato or 4-isothiocyanato derivatives of I with a suitable primary or secondary amine.

Carbamates and thiocarbamates having the Formula I can also be provided by the reaction of the substituted 4-iso-cyanato (or isothiocyanato)-1,3-thiazolidin-2-one I with an aliphatic or aromatic alcohol. Any of the alcohols described previously in the preparation of the 4-alkoxy and 4-aryloxy derivatives of I can be employed in this reaction.

While the reaction temperatures for providing the compounds of this invention vary over a wide range and are selected according to the type of reaction, temperatures from about 0 to 100° C. are generally employed. The desired substituted 1,3-thiazolidin-2-ones I are readily isolated from the reaction mixtures by conventional techniques such as filtration, distillation, recrystallization and the like.

The substituted 1,3-thiazolidin-2-ones I have a wide variety of useful applications. They are particularly effective agricultural chemicals. Thus, they are valuable pesticides, insecticides, herbicides, nematocides, etc. Generally, they are mixed with various adjuvants in these applications, and low concentrations of the compound are extremely effective.

For example, 3-phenyl-4-chloro-5,5-dimethyl-1,3-thiazolidin-2-one; 3-butyl - 4 - methoxy-5,5-dimethyl-1,3-thiazolidin-2-one and 3-phenyl-4-amino-5,5-dimethyl-1,3-thiazolidin-2-one are good foliar fungicides against tomato early blight.

The post-emergence herbicidal effectiveness of these compounds is illustrated by the control of pigweed by 3 - phenyl-4-chloro-5,5-dimethyl-1,3-thiazolidin-2-one and 3-phenyl-4-hydroxy-5,5-dimethyl-1,3-thiazolidin-2-one at a rate of application of 20 pounds per acre.

These compounds are also valuable nematocides. Thus, fumigants containing .5% by weight 3-phenyl-4-hydroxy-5,5-diethyl-1,3-thiazolidin-2-one and 3-phenyl-5,5-dimethyl-1,3-thiozolidin-2-one respectively were effective in killing the root knot nematode, a nematode which is harmful to a wide variety of plants.

The following examples will serve to illustrate the preparation of various substituted 1,3-thiazolidin-2-ones I according to the practice of this invention.

EXAMPLE 1

A 2000 ml. three-necked flask fitted with a thermometer, stirrer, reflux condenser, drying tube and dropping funnel was charged with 200 g. of iso-butyraldehyde in 600 ml. of dry ether. N-phenyl-S-chloroisothiocarbamyl chloride (453 g.) was added dropwise within two hours to the stirred solution of iso-butyraldehyde in ether while maintaining a reaction temperature of 25–30° C. by means of a water bath. Stirring of the reaction mixture was continued for two additional hours, during which time a precipitate separated. The reaction mixture was filtered and the precipitate washed with dry ether and dried in vacuum to provide 590 g. of a solid intermediate. Under exclusion of moisture, 100 g. of the intermediate was heated to 50° C. in an Erlenmeyer flask until heavy evolution of hydrogen chloride commenced. Completion of the reaction was indicated by resolidification of the reaction mixture which was recrystallized from hexane to provide 70.5 g. of solid product. The following analytical data revealed that 3-phenyl-4-chloro-5,5-dimethyl-1,3-thiazolidin-2-one, M.P. 65.5–66.5° C., had been obtained in 81 percent yield.

*Analysis.*—Calcd. for $C_{11}H_{12}ClNOS$: C, 54.66; H, 5.01; Cl, 14.67; N, 5.78; S, 13.24. Found: C, 54.22; H, 5.15; Cl, 14.20; N, 5.47; S, 13.40.

The structure of this compound was also confirmed by nuclear magnetic resonance and mass spectroscopy.

EXAMPLE 2

Following the procedure of Example 1, N-phenyl-S-chloroisothiocarbamyl chloride (103 g.) was reacted with 2-ethylbutyraldehyde (75 g.) in 200 ml. of dry ether. The crude reaction mixture was filtered and concentrated to yield a straw colored oil which was extracted with 850 ml. of dry pentane at room temperature. Concentration of the pentane solution in vacuo at −10 to 0° C. to ¼ the original volume resulted in the precipitation of 63 g. of crystalline product, M.P. 60–61° C. The following analytical data revealed that 3-phenyl-4-chloro-5,5-diethyl-1,3-thiazolidin-2-one had been obtained in 47 percent yield.

*Analysis.*—Calcd. for $C_{13}H_{16}ClNOS$: C, 57.95; H, 5.99; N, 5.20; S, 11.87. Found: C, 58.05; H, 6.11; N, 5.23; S, 12.27.

EXAMPLE 3

N-butyl-S-chloroisothiocarbamyl chloride (75 g.) in 150 ml. of dry pentane was reacted with iso-butyraldehyde (32 g.) in 250 ml. of pentane in the same manner as described in Example 1. The reaction mixture was filtered to yield a moisture sensitive solid. Dehydrochlorination according to Example 1 provided a solid product which was recrystallized from hexane to yield 24.5 g. of colorless prisms, M.P. 60–61.5° C. An additional 8.5 g. of product were obtained by cooling the original pentane filtrate to −25° C. The following analytical data revealed that 3-butyl-4-chloro-5,5-dimethyl-1,3-thiazolidin-2-one had been obtained.

*Analysis.*—Calcd. for $C_9H_{16}ClNOS$: C, 48.76; H, 7.28; Cl, 15.09; N, 6.32. Found: C, 49.56; H, 7.49; Cl, 15.00; N, 6.35.

EXAMPLE 4

To a flask containing 200 ml. of cold water was added in portions with vigorous agitation 20 g. of the intermediate obtained in Example 1. Within a few minutes, an exothermic reaction was observed and a white precipitate was deposited on the walls of the flask. Filtration of the reaction mixture provided 15.7 g. of crystalline product, M.P. 114–114.5° C. The following analytical data revealed that 3-phenyl-4-hydroxy-5,5-dimethyl-1,3-thiazolidin-2-one had been obtained in 98.5 percent yield.

*Analysis.*—Calcd. for $C_{11}H_{13}NO_2S$: C, 59.25; H, 5.87; N, 6.27; S, 14.35. Found: C, 59.42; H, 5.89; N, 6.43; S, 14.30.

EXAMPLE 5

Following the procedure of Example 4, 3-phenyl-4-chloro-5,5-diethyl-1,3-thiazolidin-2-one was hydrolyzed and the solid product recrystallized from toluene to provide 4-hydroxy-5,5-diethyl-1,3-thiazolidin-2-one, M.P. 99.5–100.5° C., in 75 percent yield.

*Analysis.*—Calcd. for $C_{13}H_{17}NO_2S$: C, 62.14; H, 6.82; N, 5.58; S, 12.74. Found: C, 62.38; H, 6.53; N, 5.14; S, 12.80.

EXAMPLE 6

Hydrolysis in the same manner as described in Example 4 of the reaction intermediate obtained from N-ethyl-S-chloroisothiocarbamyl chloride and iso-butyraldehyde provided 3-ethyl-4-hydroxy-5,5-dimethyl-1,3-thiazolidin-2-one, M.P. 72–73° C.

*Analysis.*—Calcd. for $C_7H_{13}NO_2S$: C, 47.99; H, 7.48; N, 8.00; S, 18.27. Found: C, 47.88; H, 7.35; N, 8.38; S, 18.45.

EXAMPLE 7

The amount of 15 g. of 3-phenyl-4-cloro-5,5-dimethyl-1,3-thiazolidin-2-one was added in portions to 100 ml. of methanol. After standing at room temperature for 10 minutes, the reaction mixture was filtered and excess methanol evaporated to provide a crystalline residue. This residue was de-oiled on a porous plate and then recrystallized from heptane to provide 13.3 g. of white, bulky crystals, M.P. 51.5–52.5° C. The following analytical data revealed that 3-phenyl-4-methoxy-5,5-dimethyl-1,3-thiazolidin-2-one had been obtained in 95 percent yield.

*Analysis.*—Calcd. for $C_{12}H_{15}NO_2S$: C, 60.75; H, 6.37; N, 5.91. Found: C, 61.01; H, 6.34; N, 6.10.

EXAMPLE 8

Following the procedure of Example 7, 3-phenyl-4-chloro-5,5-dimethyl-1,3-thiazolidin - 2 - one was reacted with ethanol to provide a solid crystalline product, M.P. 77.5–78.5° C. The following analytical data revealed that 3-phenyl-4-ethoxy-5,5-dimethyl-1,3-thiazolidin-2-one had been obtained in 91 percent yield.

*Analysis.*—Calcd. for $C_{13}H_{17}NO_2S$: C, 62.20; H, 6.83; N, 5.57; S, 12.73. Found: C, 62.18; H, 6.78; N, 5.66; S, 12.89.

EXAMPLE 9

An amount of 5 g. of 3-butyl-4-chloro-5,5-dimethyl-1,3-thiazolidin-2-one was reacted with methanol in the same manner as described in Examples 7 and 8. The resulting liquid product, B.P. 93° C./0.3 mm. Hg $n_D^{24}$ 1.4910, was identified by the following analytical data as 3-butyl-4-methoxy-5,5-dimethyl-1,3-thiazolidin-2-one.

*Analysis.*—Calcd. for $C_{10}H_{19}NO_2S$: C, 55.27; H, 8.82; S, 14.73. Found: C, 55.87; H, 8.83; S, 14.45.

EXAMPLE 10

Anhydrous ammonia was bubbled into 2.5 liters of ether which was cooled by means of an ice bath. When the ether was saturated with ammonia, a solution of 3-phenyl-4-chloro-5,5-dimethyl-1,3-thiazolidin-2 - one (241 g.) in one liter of ether was added slowly over a period of one hour and ten minutes to the ammonia solution. Ammonia addition was continued during this period and totalled 56 g. when addition of the 3-phenyl-4-chloro-5,5-dimethyl-1,3-thiazolidin-2-one was completed. The ice bath was removed and an additional 75 g. of ammonia was passed into the reaction mixture over a nine hour period. Filtration of the reaction mixture provided a solid material which was washed with ether, dried, washed with water and finally dried to provide 133 g. of solid product, M.P. 86–89° C. The reaction filtrate and the ether washing were combined and concentrated in vacuo to provide an additional amount of product. This crop was combined with the original, dissolved in ether, filtered, concentrated and cooled in Dry-Ice acetone. Filtration provided 160 g. of solid product, which was recrystallized from ethanol to provide a solid having a melting point of 87–88.5° C. The following analytical data revealed that 3-phenyl-4-amino-5,5-dimethyl-1,3-thiazolidin-2-one had been obtained in 72 percent yield.

*Analysis.*—Calcd. for $C_{11}H_{14}N_2OS$: C, 59.50; H, 6.36; N, 12.60; S, 14.40. Found: C, 59.67; H, 6.37; N, 12.12; S, 14.58.

EXAMPLE 11

To a stirred solution of 5.7 g. of lithium aluminum hydride in 150 ml. of tetrahydrofuran was added dropwise 24.1 g. of 3-phenyl-4-chloro-5,5-dimethyl-1,3-thiazolidin-2-one in 50 ml. of tetrahydrofuran at a temperature of between 0 and 5° C. After completion of the addition, the reaction mixture was allowed to warm to room temperature and subsequently heated at 40–50° C. for one hour. Then, 25 ml. of ice water was added to the vigorously agitated reaction mixture at 0° C. Ether (150 ml.) was added and the organic layer separated, dried over magnesium sulfate and distilled. The oily distillate was extracted with cold pentane, and the insoluble residue was recrystallized from cyclohexane to provide 9.6 g. of a solid product, M.P. 53–53.5° C., B.P. 129–130°/0.2 mm. Hg. The following analytical data revealed that 3-phenyl-5,5-dimethyl-1,3-thiazolidin-2-one had been obtained.

*Analysis.*—Calcd. for $C_{11}H_{13}NOS$: C, 63.75; H, 6.32; N, 6.76; S, 15.44. Found: C, 63.70; H, 6.22; N, 7.00; S, 15.48.

What is claimed is:

1. A substituted 1,3-thiazolidin-2-one having the formula

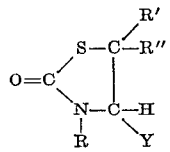

wherein R is phenyl, tolyl, xylyl, phenyl having a lower alkoxy substituent, halogenated phenyl, nitrophenyl or alkyl having 1–18 carbon atoms; R' and R" are independently selected alkyl having 1–12 carbon atoms and Y is selected from the group consisting of chlorine, hydrogen, hydroxy, and lower alkoxy.

2. The compound of claim 1 wherein R' and R" are independently selected alkyl having 1–4 carbon atoms.

3. The compound of claim 1 wherein Y is chlorine.

4. The compound of claim 3 having the name 3-phenyl-4-chloro-5,5-dimethyl-1,3-thiazolidin-2-one.

5. The compound of claim 3 having the name 3-phenyl-4-chloro-5,5-diethyl-1,3-thiazolidin-2-one.

6. The compound of claim 3 having the name 3-butyl-4-chloro-5,5-dimethyl-1,3-thiazolidin-2-one.

7. The compound of claim 1 wherein Y is hydroxy.

8. The compound of claim 7 having the name 3-phenyl-4-hydroxy-5,5-dimethyl-1,3-thiazolidin-2-one 9. The compound of claim 1 wherein Y is lower alkoxy.

10. The compound of claim 9 having the name 3-phenyl-4-methoxy-5,5-dimethyl-1,3-thiazolidin-2-one.

11. The process for preparing the compound of claim 3 which comprises reacting (a) an S-chloroisothiocarbamyl chloride having the formula

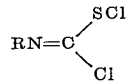

wherein R is phenyl, tolyl, xylyl, phenyl having a lower alkoxy substituent, halogenated phenyl, nitrophenyl, or alkyl having 1–18 carbon atoms with (b) a secondary aldehyde having the formula

R'R"CHCHO wherein R' and R" are independently selected alkyl having 1–12 carbon atoms at a temperature between about −20 and 100° C. in the presence of an inert organic solvent.

References Cited

Bayer: Chem. Abstracts, vol. 65, cols. 13717–8 (1966).

ALEX MAZEL, Primary Examiner

R. J. GALLAGHER, Assistant Examiner

U.S. Cl. X.R.

71—90; 424—270